(12) United States Patent
Stark

(10) Patent No.: US 10,371,456 B2
(45) Date of Patent: Aug. 6, 2019

(54) METHOD USING HEAT PIPES WITH MULTIPLE EVAPORATOR/CONDENSER ZONES AND HEAT EXCHANGERS USING SAME

(71) Applicant: Kentuckiana Curb Company, Inc., Louisville, KY (US)

(72) Inventor: Walter Stark, Huntington, NY (US)

(73) Assignee: KENTUCKIANA CURB COMPANY, INC., Louisville, KY (US)

( * ) Notice: Subject to any disclaimer, the term of this patent is extended or adjusted under 35 U.S.C. 154(b) by 459 days.

(21) Appl. No.: 14/952,380

(22) Filed: Nov. 25, 2015

(65) Prior Publication Data

US 2016/0084585 A1 Mar. 24, 2016

Related U.S. Application Data

(63) Continuation-in-part of application No. 13/317,660, filed on Oct. 25, 2011, now abandoned.

(51) Int. Cl.
| | |
|---|---|
| *F28D 15/04* | (2006.01) |
| *F28F 13/08* | (2006.01) |
| *F28D 15/02* | (2006.01) |
| *F28F 1/26* | (2006.01) |
| *F24F 12/00* | (2006.01) |
| *F28F 1/32* | (2006.01) |

(52) U.S. Cl.
CPC ......... *F28D 15/04* (2013.01); *F28D 15/0275* (2013.01); *F28F 13/08* (2013.01); *F24F 2012/005* (2013.01); *F28F 1/26* (2013.01); *F28F 1/32* (2013.01); *Y02B 30/563* (2013.01)

(58) Field of Classification Search
CPC ...... F28D 15/00; F28D 15/02; F28D 15/0266; F28D 15/0275; F28D 15/04; F28F 13/08; F28F 1/26; F24F 2012/005; Y02B 30/563
See application file for complete search history.

(56) References Cited

U.S. PATENT DOCUMENTS

| | | | | |
|---|---|---|---|---|
| 4,299,272 A | * | 11/1981 | Del Bagno, Sr. | ... F28D 15/0275 165/103 |
| 5,913,360 A | * | 6/1999 | Stark | ..... F24F 3/1405 165/103 |
| 5,921,315 A | * | 7/1999 | Dinh | ....... F24F 3/153 165/104.14 |

* cited by examiner

*Primary Examiner* — Travis C Ruby
(74) *Attorney, Agent, or Firm* — Middleton Reutlinger

(57) ABSTRACT

Elongated, smaller-diameter tube heat pipes have an airflow arrangement that allows for short distances between evaporating and condensing sections of the heat pipe. The heat pipe is exposed to multiple alternate hot and cold zones adjacent to each other. Each evaporator zone accepts input heat to cause evaporation of the working fluid in the wick of the immediate vicinity. The vapor produced moves to either side by local pressure differences to condense in the two adjacent condenser zones where it is absorbed by the wick as a liquid and flows in the wick back to adjacent evaporator zones at each side. Each evaporator zone creates two fluid loops whereby evaporated working fluid splits up left and right, condenses in adjacent condenser zones and flows back to the evaporator zone as a liquid within the wick. Therefore, the overall tube length can be increased indefinitely, without traditional degradation of performance.

22 Claims, 7 Drawing Sheets

METHOD USING HEAT PIPES WITH MULTIPLE EVAPORATOR/CONDENSER ZONES AND HEAT EXCHANGERS USING SAME

RELATED APPLICATIONS

This application is a continuation-in-part of application Ser. No. 13/317,660, filed Oct. 25, 2011, (the '660 application) and claims priority under 35 USC § 120 therefrom. The '660 application is incorporated by reference herein.

FIELD OF THE INVENTION

The present invention relates to using efficient small diameter heat pipes with multiple evaporator/condenser zones in a single heat pipe.

BACKGROUND OF THE INVENTION

Heat pipe technology is old art incorporating the use of an evacuated sealed metal pipe partially filled with a working fluid. A wide variety of working fluids may be used; they are selected to be compatible with the temperature regime of the two heat transfer pairs between which heat is being transferred. The heat source must be able to evaporate the working fluid while the heat sink must be able to condense the vapor back into a liquid. Heat pipes also typically contain an internal wick coating to return condensed working fluid back to the heated evaporator zone. While heat pipes are relatively inexpensive to manufacture and offer orders of magnitude effective thermal conductivity as compared to solid copper of similar size, there are some limitations to their physical construction for proper operation.

Heat pipes typically degrade in performance as the tube length increases. Increasing tube diameter can help alleviate this issue, but larger tubes come with their own inefficiencies. It is known that smaller tubes offer greater efficiency, but in heat pipes smaller tubes restrict the length of the tube. Longer heat pipes of smaller diameter, if practical, would offer an opportunity to construct cost-competitive compact and efficient air-to-air heat exchangers.

U.S. Pat. No. 5,913,360 of Stark describes a heat exchanger with cooling coil fins 47 in FIGS. 6 and 7. The cooling coil fins are not baffles separating air streams. In addition, Stark '360 shows in FIG. 6 a cooling coil 66 which is an evaporator only. There are no condenser zones in cooling coil 66 of Stark '360. Stark '360 does not in FIG. 6 any uninterrupted extended length or serpentine heat exchanger 66, and does not describe multiple adjacent evaporator/condenser zones In U.S. Pat. No. 5,921,315, inventor Khanh Dinh describes a heat exchanger of serpentine pipes where there is no external airside air flow affecting the heat exchange inside of Dinh's apparatus.

Dinh '315 also makes an observation which he illustrates in a figure similar to prior art FIG. 12 of this invention. Heat pipe heat exchanger 58 uses serpentine heat pipe 56 formed by U-bends 51 connecting adjacent straight sections 50 of pipe or tube which are embedded in heat conducting fins 52. Each tube 50 is shown with optional internal microgrooves 53 to enhance heat transfer.

Dinh '315 notes that it had been thought that inserting a predetermined amount of refrigerant 54 into the open end of edge tube 55 of serpentine 56 to permit each tube 50 to function as a separate heat pipe in steady state would require the use of a manifold to properly distribute the refrigerant. However, Dinh '315 discovered that no manifold was necessary and that by inserting the proper amount of refrigerant 54 in edge tube 55 it would become evenly distributed in tubes 50 (as shown) after a few minutes of normal operation of heat exchanger 58. Thus a single charging port can be used with a serpentine heat pipe heat exchanger without the use of any straight pipe manifolds.

U.S. Pat. No. 4,299,272 of Del Bagno, describes an Industrial Heat Pipe Recovery Package Unit "which is easily cleaned to remove contaminants which have collected on the finned heat exchange units" (col. 1, penultimate paragraph) so that brackets 302 and 305 "facilitate heat tube placement, insertion and removal" (col. 3, last par.). Del Bagno '272 does not teach or suggest a baffle arrangement being used to separate the heat transfer fluids flowing over the outside of the heat pipe. In Del Bagno there is shown an industrial heat pipe energy recovery package unit "which is easily cleaned to remove contaminants which have collected on the finned heat exchange units" (col. 1, penultimate paragraph) so that brackets 302 and 305 "facilitate heat tube placement, insertion and removal" (col. 3, last par.). Del Bagno's brackets do not separate multiple, adjacent air flows into multiple adjacent evaporator/condenser zones influenced by exterior air side air streams Del Bagno '272 shows in FIG. 1 a single pair of two opposing air streams 100 and 200, traveling through a heat pipe heat exchanger 230. Both opposing air streams 100 and 200 have the ability to bypass the heat exchanger through the use of face and bypass assemblies 130 and 210 in the intake and exhaust airstreams. Del Bagno '272 identifies the air streams 100 and 200 as "SUPPLY SIDE" 100 and "EXHAUST SIDE" 200. Del Bagno '272 identifies these two air streams as a single supply side 100 and a single exhaust side 200

Del Bagno '272 also comprises a spray chamber 220, shown in FIGS. 2 and 3. The spray chamber 220 is shown in the exhaust air stream in FIG. 2, which comprises essentially one half of the spray chamber, while the remaining half allows the intake air to pass unimpeded. FIG. 4 of Del Bagno '272 also shows structural tube supports 302, 305 that are required to keep the heat tubes straight and free from sagging when the tube length exceeds a specified length. A single center divider made of structural tube supports 302, 305 is shown in FIG. 4 of Del Bagno '272 to divide the single intake air stream and the single exhaust air stream, while also serving to support the tubes 301. The same mechanism is used for the sole purpose of supporting the tubes to the left and right of center.

In connection therewith, Del Bagno '272 states at column 3, lines 49, 50 as "mounting brackets 302 and 305". Del Bagno continues to state from column 3, line 68 to column 4, line 10 as follows:

"The bracket assembly comprises two end brackets 302 and one more intermediate brackets 305 whose number will vat), according to the row depth requirements of the specific application. The brackets are provided with mounting flanges 303 on their ends and spaced tube receiving recesses 304 along their sides. In their assembled relationship the recesses 304 in the respective brackets form circular apertures 306 which secure the heat tubes in place and accommodate the integral finned surface 301 on the heat tube."

Clearly Del Bagno teaches a single air supply input stream 100 and a single air exhaust stream 200, as shown in FIGS. 1, 2 and 4 therein. They are clearly marked in Del Bagno '272 as two counterflow air streams, one hot and one cold.

OBJECTS OF THE INVENTION

It is therefore an object of the present invention to use smaller diameter tube heat pipes with an airflow arrangement that allows for short distances between multiple, adjacent evaporating and condensing sections of the heat pipe.

It is also an object to increase the overall tube length indefinitely, without traditional degradation of performance, either as a straight tube or as a serpentine tube with undulating pipes.

Other objects will become apparent by the following description of the invention.

SUMMARY OF THE INVENTION

The method of this invention utilizes smaller-tube heat pipes with an airflow arrangement that allows for short distances between evaporating and condensing sections of the heat pipe. Therefore, the overall tube length can be increased indefinitely, without traditional degradation of performance. Length of each tube is infinitely variable. While tube diameters of each heat pipe may vary, typical tube diameters may be ⅛ inch to 2 inches in diameter, although they can be smaller than ⅛ inch in diameter or more than 2 inches in diameter.

Traditional heat pipes have one evaporator end where input heat is added and one condenser end where heat is extracted. In contrast, in the heat pipe method of this invention, a heat pipe is exposed to multiple alternate hot and cold zones adjacent to each other by external means. So, although the heat pipe itself is of traditional construction, it no longer has a single evaporator end and a single condenser end. The operation is similar to that of a string of short heat pipes laid end to end, but the single long small diameter heat pipe is more practical and of much lower cost to manufacture. In operation, each evaporator zone accepts input heat to cause evaporation of the working fluid in the wick of the immediate vicinity. The vapor produced moves to either side by local pressure differences to condense in the two adjacent condenser zones where it is absorbed by the wick as a liquid and flows in the wick back to adjacent evaporator zones at each side. Thus each evaporator zone creates two fluid loops, whereby evaporated working fluid splits up left and right, condenses in the adjacent condenser zones and flows back to the evaporator zone as a liquid within the wick.

In general, a heat pipe heat exchanger includes an end to end uninterrupted length of straight or undulating serpentine heat pipe with multiple adjacent evaporator/condenser zones contained within said length of heat pipe, in excess of a single pair of an evaporator zone and a condenser zone. A wick lines without interruption an interior wall of the heat pipe extending throughout the length of said heat pipe passing through said adjacent evaporator/condenser zones.

The adjacent zones include multiple, alternate pairs of adjacent hot and cold regions, such that the regions go from hot to cold to hot and back to cold along the length of the heat pipe, wherein each evaporator region accepts input heat to cause internal evaporation of working fluid in a wick region of each evaporation region.

The heat pipe produces vapor moving to either side of the heat pipe by local pressure differences to condense in one or two adjacent condenser zones, where the vapor is absorbed by the wick as a liquid and flows the liquid in the wick back to one or two adjacent evaporator zones of the heat pipe. Each adjacent evaporator zone creates at least one fluid loop whereby evaporated working fluid splits up left and/or right, condensing in adjacent condenser zones and the working fluid flows back to the respective evaporator zone as a liquid within the wick. The heat pipe adjacent condenser zones thereby operating internally with multiple adjacent evaporator and condenser zones as induced by respective external air flows, as distinguished from Dinh '315, where all air flows are internal, and there are no external airside air flows in Dinh '315 affecting the zones.

Spaced baffles of the present invention define zones and regions mounted on and extending radially outwardly from an outside surface of the heat pipe separating hot and cold regions of the heat pipe, whereby a baffle separates each zone from an adjacent zone, and a baffle separates hot and cold regions within each zone, forming adjacent evaporator and condenser areas outside of the heat pipe for flow of heat transfer fluids over the heat pipe. As a result, overall straight or serpentine tube length of the heat pipe is extensible indefinitely for adding alternating evaporator and condensing regions in a straight line or serpentine continuous configuration, without traditional degradation of performance.

In an alternate embodiment of the heat pipe of this invention, additional torus shaped (like a donut or washer) plugs are added internally to partition each pair or grouping of pairs of heat/cool zones from the adjacent one. The central openings in the plugs allow gas pressures to equalize As the plugs may be rigid and extended to the inside of the heat pipe housing, they would partition the wick layer by actually cutting it or squeezing it against the housing. The plugs may also be resilient such as an elastomer/rubber in which case the wicking internal layer would also be squeezed so as to limit liquid flow within the heat/cool zone. The solid walls of the plugs act as a dam to hold liquid between hot/cold sections of pipe. The purpose of these added plugs is also to counteract any gravitational effects due to sagging or bowing of a long heat pipe or not being horizontally level thereby inducing the puddling of liquid which can result in the wick. Note that the vapor flow would be mainly confined to flow from hot to cold region within the partitioned sections, but the central hole will permit some vapor flow to adjacent regions to equalize any positional or temporal imbalances along the heat pipe.

A heat pipe used by the method of this invention by creating alternate adjacent evaporator/condenser pairs along its length can be applied to a variety of applications such as removing heat from electronics or in medical equipment or chemical manufacture. Liquid-to-liquid, liquid-to-air, contact surface-to-contact surface, or air-to-air heat transfer can be accommodated. In this invention, air-to-air heat exchangers for HVAC application will be discussed.

Although other configurations are possible, the heat exchangers of this invention are configured in a geometry not unlike that of fin tube heat exchangers commonly used in cooling coils, steam heating, and similar applications. The long small diameter heat pipes run parallel to each other preferable through common fins; they are passive independent entities and therefore not interconnected fluidically. They are placed in the same positions of the long parallel runs in a similar fin tube unit. One or more heat pipes can be used forming a flat rectangular array. Multiple rows of heat pipes can also be configured, preferably staggering the heat pipes in each row. A four sided housing around the sides of the heat pipe/fin unit leaves the fins exposed on top and bottom completing the heat pipe heat exchanger (HPHE).

In a preferred embodiment, triangular crossection manifolds as described in U.S. Pat. No. 6,182,747 of Stark are attached on top and bottom of the heat pipe/fin unit. Since the manifolds have divider flanges which seal along the ends of the heat pipe heat exchanger (HPHE) fins, they automatically create the multiple adjacent evaporator/condenser zones along the heat pipes. By selecting the orientation of the bottom manifold relative to the top manifold, either parallel flow or crossflow heat exchangers can be configured.

In an alternate system for dehumidification, a single triangular manifold is used on top of the heat pipe heat exchanger (HPHE). A cooling coil is placed underneath the heat pipe heat exchanger (HPHE) with baffles maintaining the same zone separations as that of the triangular manifold. Under the cooling coil section is a drain pan with baffles separating each evaporator/condenser pair such that incoming air passes through each input manifold passageway and through the heat pipe heat exchanger (HPHE), then down through the cooling coil, then reversing direction through the drip pan, up through the cooling coil, further up through the heat pipe heat exchanger (HPHE), and then discharging through the exhaust part of the manifold. This flow constitutes a two-pass dehumidification cycle.

In an alternate embodiment of manifold construction, optional integral dampers are used in the triangular manifold. In this embodiment, the air is allowed to pass through dampers in the manifold walls, without going through the dehumidification process. The benefit here is to relieve the pressure drop and subsequent energy penalty when dehumidification is off. The preferred embodiment uses a triangular shaped manifold to conserve material. However, any shape of manifold is acceptable, so long as it is essentially one continuous zig-zagging wall that separates the incoming and outgoing air streams

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
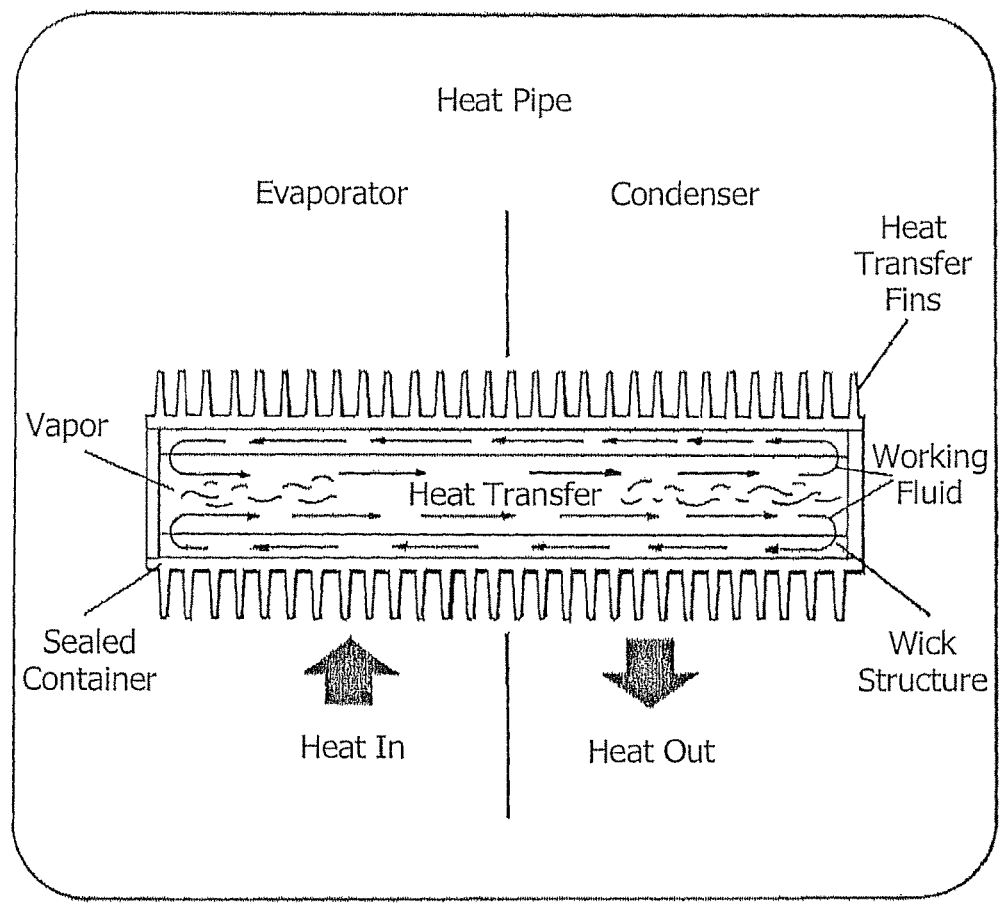
FIG. 1 is an annotated side schematic representation of a traditional heat pipe and method associated therewith.

FIG. 1 illustrates the operation of a typical prior art heat pipe with a single divider externally separating evaporator from the condenser section. Note the one-way internal vapor flow to the right in the open center and the reverse liquid flow in the wick.

Figure 2:
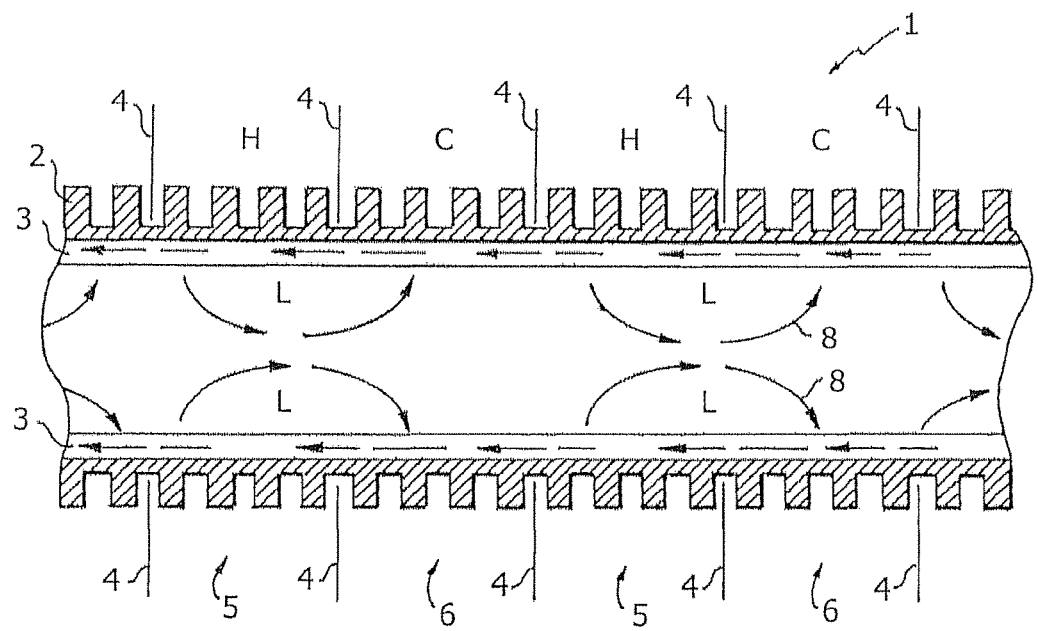
FIG. 2 is a side crossectional detail of a section of heat pipe as used in a method of this invention with multiple adjacent evaporator/condenser zones.

FIG. 2 shows a section of heat pipe using the multiple adjacent evaporator/condenser (hot/cold) sections method along the entire length of a heat pipe 1. The outer side 2 is shown as a rigid finned tube with an internal wick 3 bonded to it. Baffles or partitions 4 keep the external hot 5 and cold 6 flows or regions separated. Vapor 8 evaporates into the central section and partitions into a right and a left drift to the adjacent cold condensing section 6 from each hot evaporating section 5. FIG. 2 also shows the direction of liquid flow within wick 3 in both directions toward adjacent evaporator 5 sections. This flow generates short loops of vapor/liquid within the heat pipe, which negates the inherent inefficiency associated with conventionally used long heat pipes of small diameter. Applicant's drawing FIGS. 2 and 2a denotes "H" and "C", which are used to denote external "Hot" and "Cold" air flows with the induced internal evaporator and condenser zones and flow loops located inside of the heat pipe heat exchanger.

Figure 7:
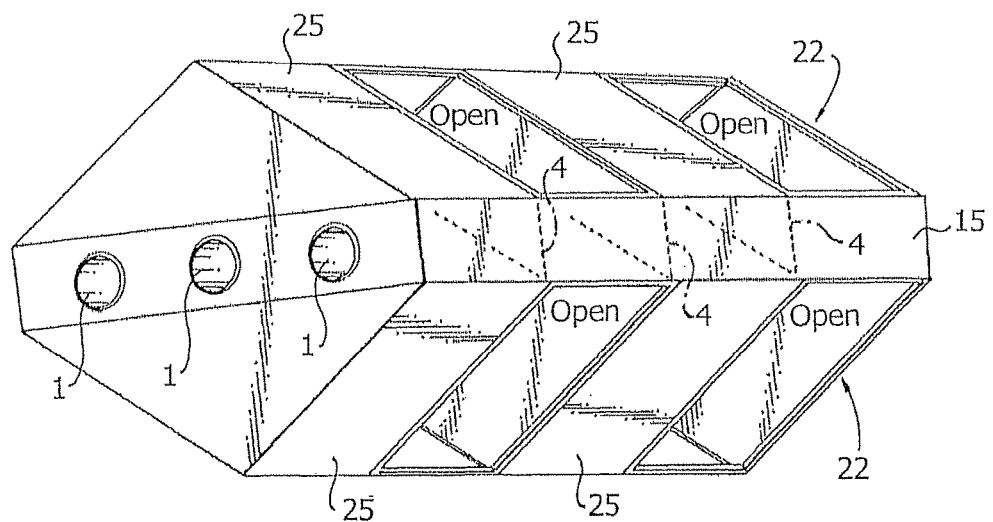
FIG. 7 is a heat pipe heat exchanger (HPHE) of this invention with manifolds attached on top and bottom thereof.
Figure 10:
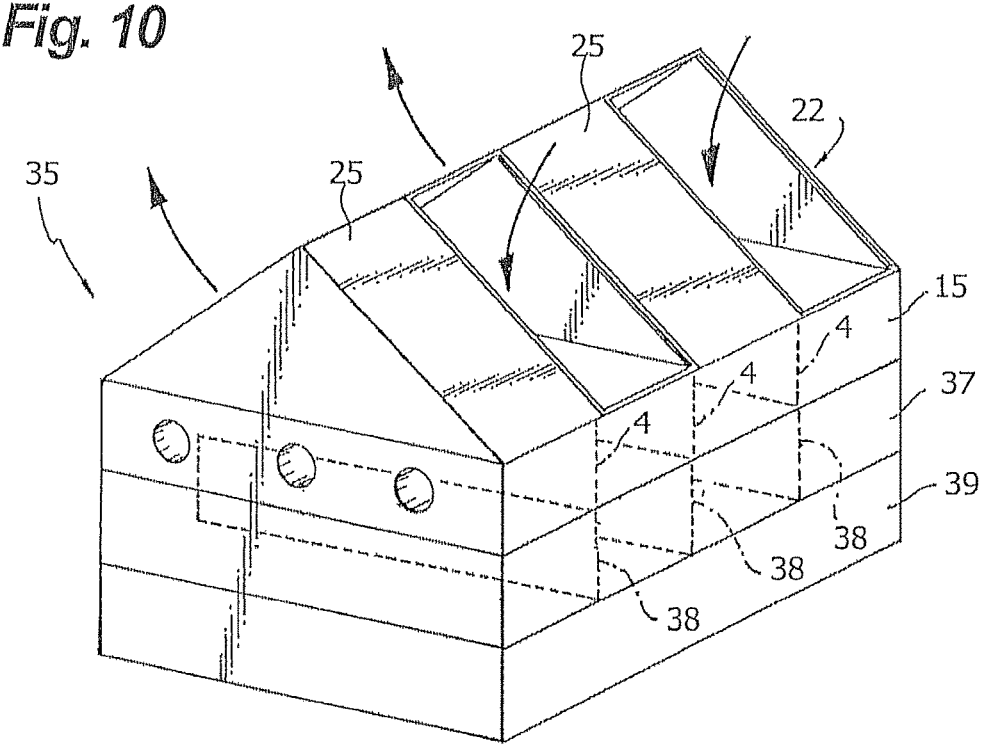
FIG. 10 is a perspective view of an alternate embodiment for a dehumidification system configured with a heat pipe heat exchanger (HPHE).
Figure 11:
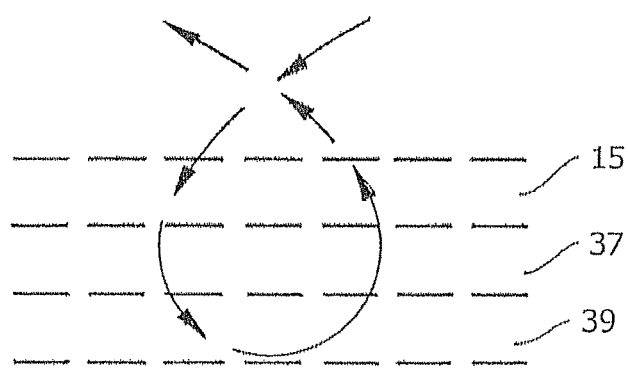
FIG. 11 illustrates the two-pass air flow pattern through the dehumidification system of FIG. 10.

Air flow partitioning and impingement thereof externally is shown in FIGS. 7 and 10.

In contrast, Dinh has no such external impingement of air flows, wherein in Dinh all the air flows are internally derived and operated.

Applicant's invention is therefore an improvement to a heat pipe, and which focuses on the external airside of the heat pipe device affecting multiple adjacent alternating hot and cold zones in the heat pipe.

Figure 2A:
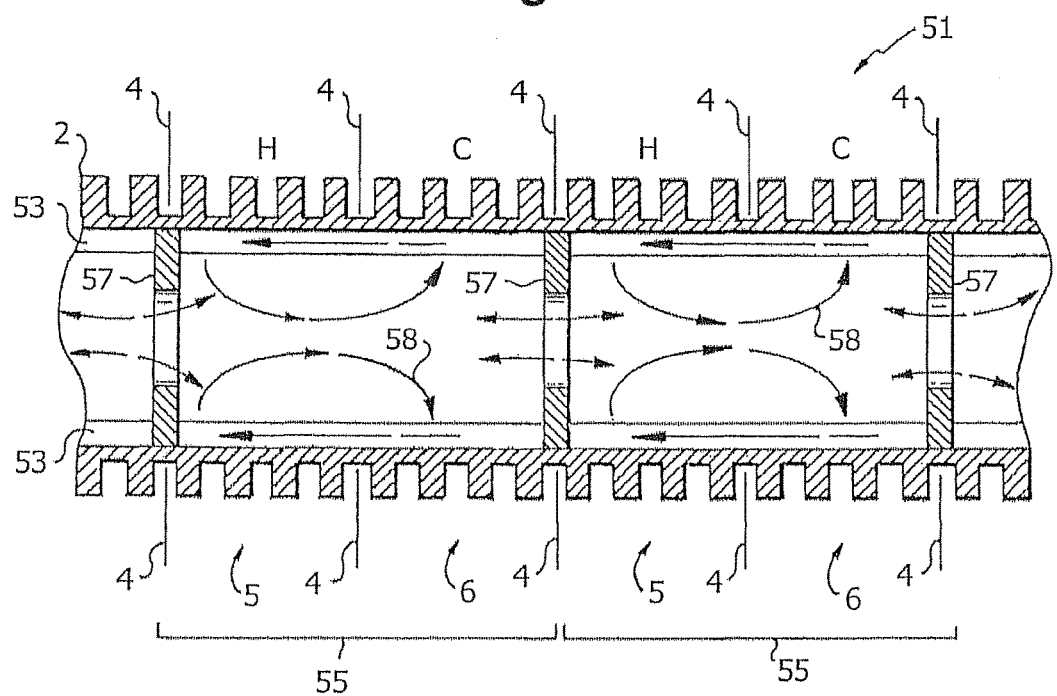
FIG. 2A is a side crossectional detail of an alternate embodiment of heat pipe as used in a method of this invention whereby internal plugs are added separating each pair or grouping of pairs of heat/cool zones.

FIG. 2A shows an alternate embodiment of heat pipe 51 wherein each pair or grouping of pairs of heat/cool zones 55 are internally isolated by a torus shaped plug 57 which limits liquid flow within wick 53 to the length of a heat/cool zone. For example, FIG. 2A shows respective torus shaped plugs 57 separating each heat/cool zone 55 from each other heat/cool zone 55. However, each pair of torus shaped plugs 57 can separate groups of two or more heat/cool zones 55 from other groups of heat/cool zones 55 or from a single heat/cool zone 55. Vapor 58 is also largely limited to loop from hot to cold zone within this region although a small amount of vapor can flow to adjacent regions through the central hole in plugs 57. This embodiment has the ability to counteract pooling or puddling of liquid within wick 53 along the heat pipe due to gravity in cases of significant deviation from horizontal positioning as well as any buckling or sagging of the long heat pipe 51.

Figure 3:
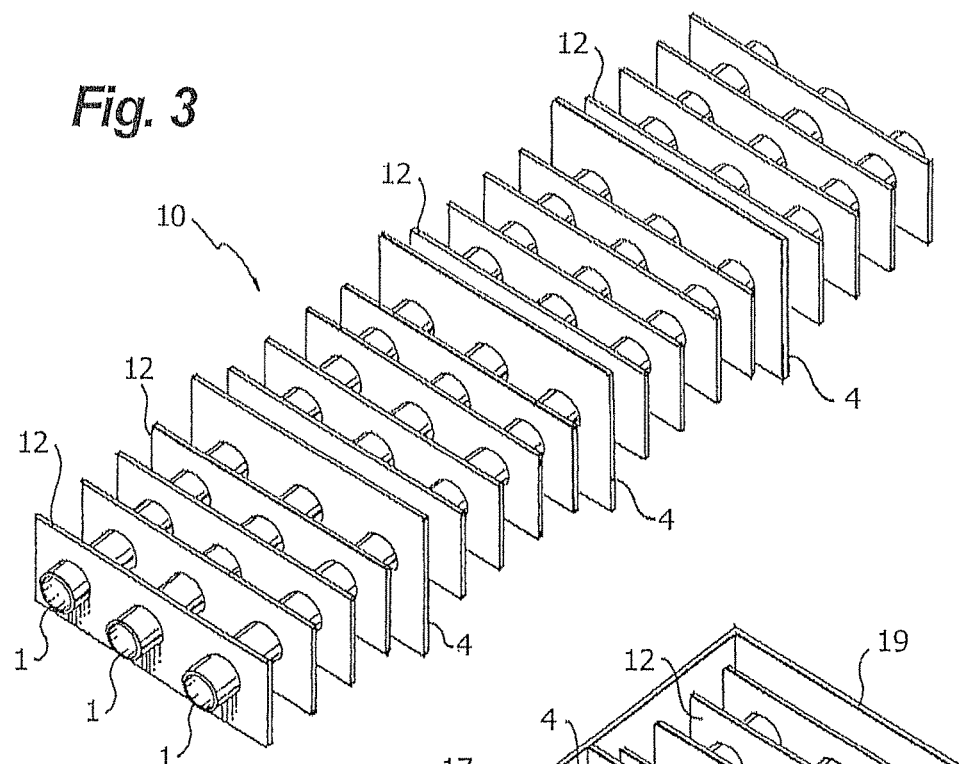
FIG. 3 is a perspective view of a heat pipe/fin assembly of this invention.

FIG. 3 shows a heat pipe/fin unit 10 with three heat pipes 1 and multiple parallel fins placed transverse to heat pipes 1 and intimately attached to each. In this embodiment, the outer heat pipe wall is smooth and the fins 12 are shared among the three heat pipes 1. Many more than 3 heat pipes can be used, and multiple rows can also be configured with shared or not shared fins 12. A single heat pipe can be used as well.

Figure 4:
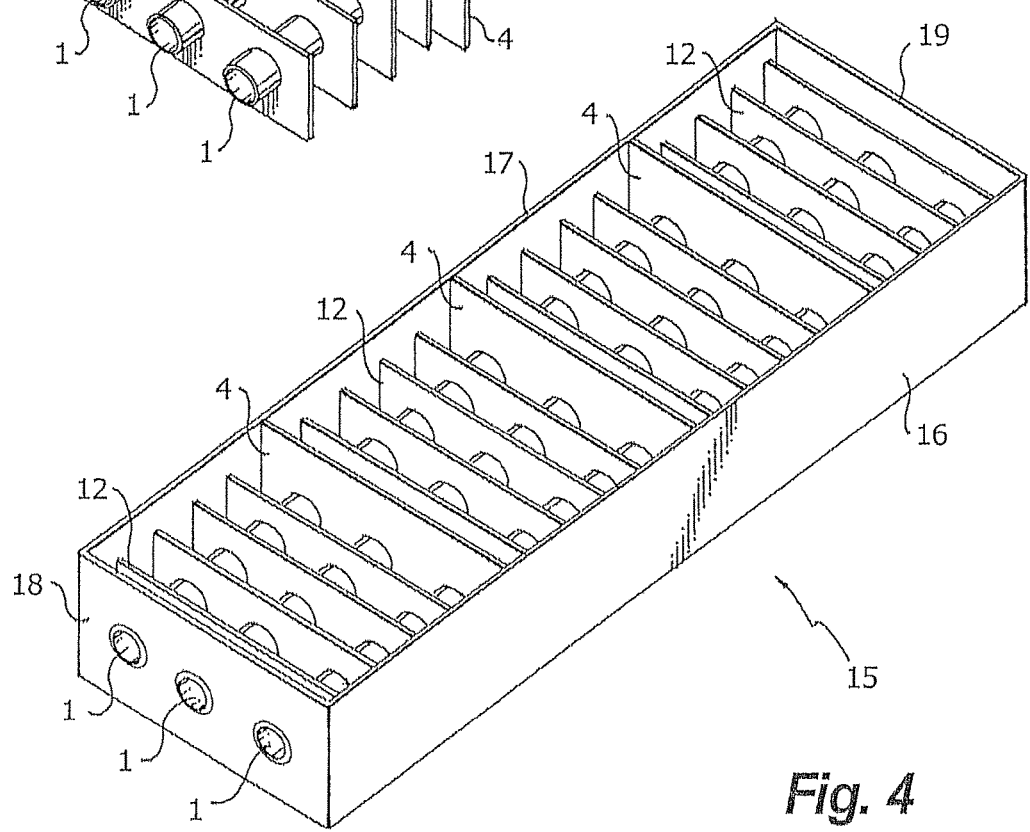
FIG. 4 is a perspective view of a heat pipe heat exchanger (HPHE) of this invention.

FIG. 4 illustrates how the addition of two end panels 18 and 19 as well as side panels 16 and 17 transform heat pipe/fin assembly 10 into a functioning heat pipe heat exchanger (HPHE) 15.

Figure 5:
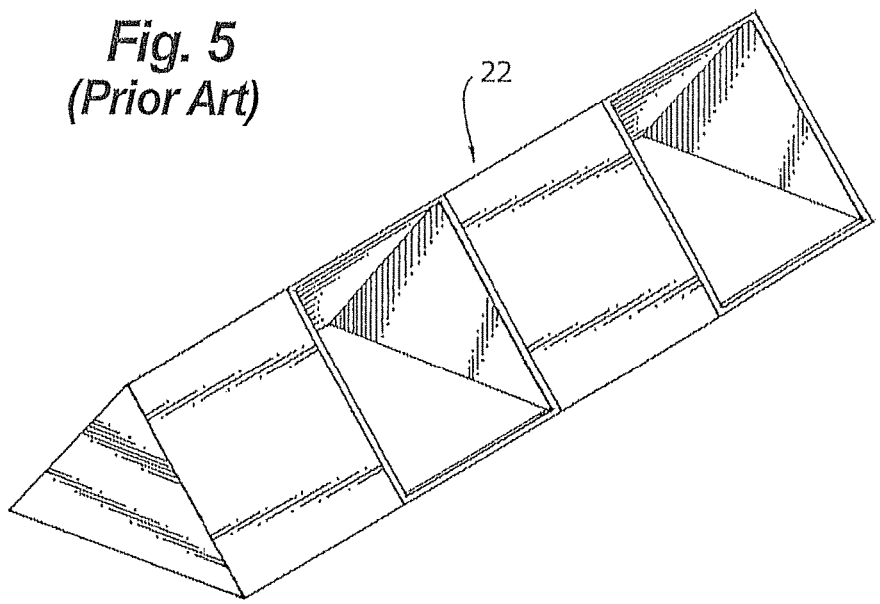
FIG. 5 is a perspective view of a prior art triangular manifold as used in one embodiment of this invention.
Figure 6:
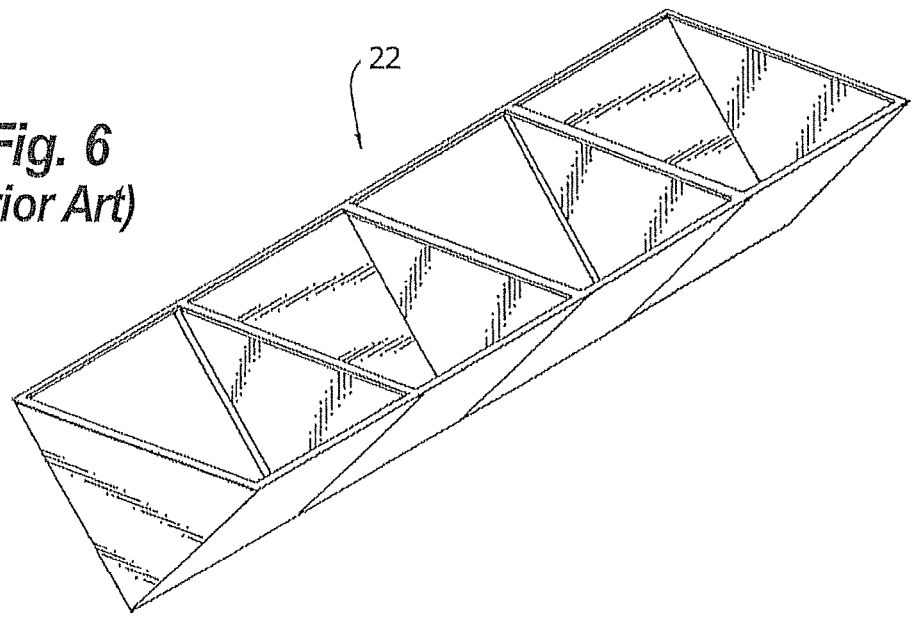
FIG. 6 is a perspective view of the manifold of FIG. 5 when viewed from a different angle.

FIGS. 5 and 6 are two views of a prior art triangular sheet metal manifold 22 that is used with heat pipe heat exchanger (HPHE) 15. The manifolds 22 have adjacent open and blocked sections on either side. Manifolds 22 seal to the top and bottom edges of fins 12 in their vicinity when placed in contact with heat pipe heat exchanger (HPHE 15).

FIG. 7 shows one manifold 22 attached to the top of heat pipe heat exchanger (HPHE) 15 and one at the bottom. FIG. 7 also illustrates the blocking panels 25 of top manifold 22 being in registration with those of bottom manifold 22. The open sections are also in registration.

Figure 8:
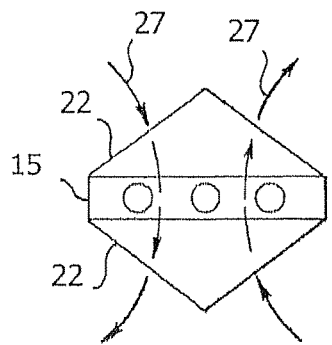
FIG. 8 illustrates the parallel flow configuration which results from the heat pipe heat exchanger with manifolds of the configuration of FIG. 7.

This configuration results in the parallel air flow 27 shown in FIG. 8.

Figure 9:
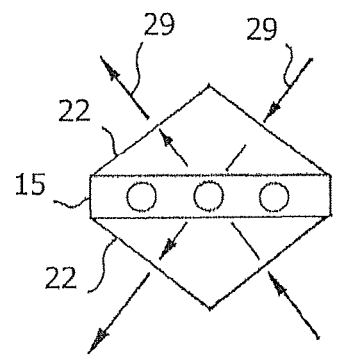
FIG. 9 shows the cross flow which results by re-orienting the bottom or top manifold relative to the other top manifold as shown in FIG. 7.

The alternate crossflow 29 of FIG. 9 is achieved by having open panels in bottom manifold 22 in registration with blocking panels 25 in top manifold 22.

The alternate embodiment of the dehumidification system 35 of FIG. 10 uses a single triangular manifold 22 atop heat pipe heat exchanger (HPHE) 15 with a rectangular cooling coil 37 underneath and a drip pan 39 at the bottom. Cooling coil 37 has internal baffles 38 in registration with manifold 22 partitions above to continue the separation of flow regions. With the internal baffles, the two-pass air flow through the dehumidifier is achieved. In the prior art dampers are used to bypass air from one side of the manifold to the other, but they are not integral to the manifold as shown in the new invention.

Figure 12:
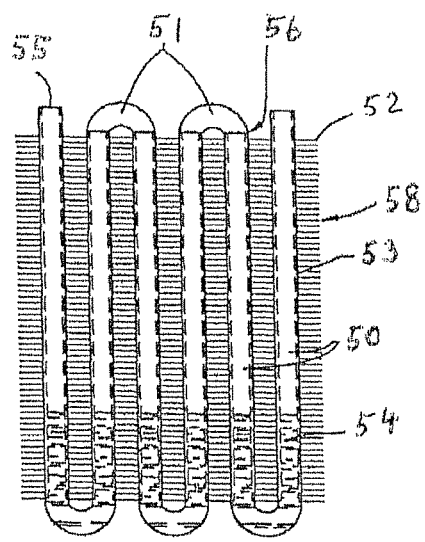
FIG. 12 is a front elevation of a prior art serpentine heat exchanger.

FIG. 12 shows a prior art serpentine heat exchanger of Dinh '315.

Figure 13:
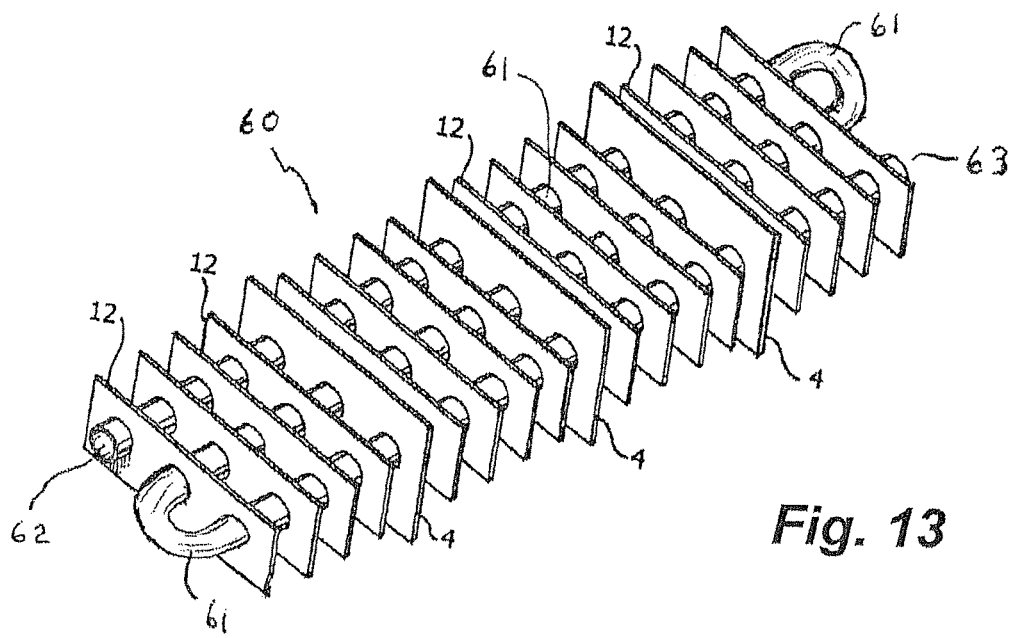
FIG. 13 is a perspective view of an alternate embodiment heat pipe fin unit of this invention.

FIG. 13 shows an alternate embodiment of heat pipe/fin unit 10 shown in FIG. 3. The three separate straight heat pipes 1 of FIG. 3 have been replaced by a single serpentine heat pipe 61 in heat pipe/fin unit 60 of FIG. 13. A single charging port 62 is used to charge refrigerant for all three straight sections of serpentine heat pipe 61 as taught by inventor Dinh '315's observation in the Dinh '315 patent. End 63 would be plugged in normal operation. Although only three straight sections of serpentine heat pipe 61 are shown, it can be appreciated that two, three, or more straight sections of a single serpentine heat pipe could be serviced by a single charging port in this manner.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A heat pipe heat exchanger comprising:
   an end to end length of a heat pipe;
   a housing having opposing side panels and opposing end panels creating a chamber therein, and a plurality of baffles spaced along said chamber between said end panels in a direction transverse to said length of said heat pipe creating a plurality of separate alternating hot and cold regions exterior to and along said length of said heat pipe extending in said direction between said opposing end panels;
   said heat pipe includes multiple adjacent evaporator/condenser zones contained within said length of said heat pipe, in excess of a single pair of an evaporator zone and a condenser zone;
   a wick lining an interior wall of said heat pipe continuously throughout the length of said heat pipe passing through said adjacent evaporator/condenser zones;
   working fluid contained within said wick;
   said adjacent evaporator/condenser zones interior to said heat pipe correspond to alternate pairs of adjacent said hot and cold regions exterior to said heat pipe defined by said plurality of baffles, such that said regions go from hot to cold to hot and back to cold along said length of said heat pipe, wherein said adjacent evaporator/condenser zones being in open communication with each other internally within said heat pipe across said regions, and wherein said adjacent hot and cold regions being in closed communication with each other externally outside said heat pipe within said chamber by said plurality of baffles;
   wherein each evaporator zone accepts input heat to cause internal evaporation of working fluid in a wick region of each said evaporator zone;
   said heat pipe producing vapor moving to either side of said heat pipe by local pressure differences to condense in one or two adjacent said condenser zones, where said vapor is absorbed by said wick as a liquid and flows said liquid in said wick back to one or two adjacent said evaporator zones within said heat pipe;
   each said evaporator zone creating at least one fluid loop whereby evaporated working fluid splits up left and/or right, condensing in adjacent said condenser zones and said working fluid flows back to the respective said evaporator zone as a liquid within said wick;
   said heat pipe adjacent said condenser zones thereby operating internally with multiple adjacent said evaporator and condenser zones as induced by respective external air flows;
   in which cold air is delivered to said cold regions by an external cooling source and hot air is delivered to said hot regions by an external heating source and heat is withdrawn from said heat pipe in said cold regions by condensation of the working fluid, while heat is added to said heat pipe in said hot regions by evaporation of the working fluid, causing circulation of said working fluid within said heat pipe.

2. The heat pipe heat exchanger as in claim 1 wherein said end to end length of said heat pipe with multiple said adjacent evaporator/condenser zones is a straight length of said heat pipe.

3. The heat pipe heat exchanger as in claim 1 wherein said heat pipe with multiple said adjacent evaporator/condenser zones is an undulating, serpentine length of heat pipe.

4. The heat pipe heat exchanger as in claim 2, having a plurality of said straight lengths of said heat pipes is laid parallel to each other.

5. The heat pipe heat exchanger as in claim 1 further comprising said heat pipe having a diameter in the range of about ⅛ inch to about 2 inches.

6. The heat pipe heat exchanger as in claim 4, wherein said plurality of said heat pipes run parallel to each other through common fins; said plurality of said heat pipes being passive independent entities and not being interconnected fluidically.

7. The heat pipe heat exchanger as in claim 6, wherein said plurality of said heat pipes form a flat rectangular array.

8. The heat pipe heat exchanger as in claim 6, wherein multiple rows of said plurality of heat pipes are staggered in each row.

9. The heat pipe as in claim 6, wherein said fins are exposed on top and bottom portions of said heat pipe heat exchanger, said housing containing only said straight lengths of said heat pipes and no curved portions.

10. The heat pipe heat exchanger of claim 1, wherein said heat pipe has spaced heat transfer fins on an outer surface thereof for facilitating heat transfer to and from fluid circulating over said heat pipe between respective adjacent said baffles of said plurality of baffles defining said regions.

11. The heat pipe heat exchanger of claim 1 further comprising a dehumidification system having a cooling coil being placed underneath said heat pipe heat exchanger with said plurality of baffles maintaining respective said region separations through said cooling coil, wherein further under said cooling coil is provided a drain pan with respective baffles separating each respective adjacent said hot and cold regions such that incoming air passes through each respective input of a manifold passageway and through said chamber having said heat pipe then down through said cooling coil, then reversing direction through said drain pan, up through said cooling coil, further up through said chamber having said heat pipe, and then discharging through an exhaust port of said manifold passageway, wherein the air flow is a two-pass dehumidification cycle.

12. A method of heat exchange comprising the steps of:
using a length of a heat pipe to transfer heat between a first heat transfer fluid and a second heat transfer fluid, said heat pipe being straight from a first end to a second end thereof, said heat pipe having an inside wall coated with a wick extending continuously over a whole length of said heat pipe, said wick having working fluid contained thereby within said wick, and said heat pipe having a diameter within the range of about $1/8$ inch to about 2 inches to allow an extension of said heat pipe for adding alternating evaporator and condensing zones forming and separating adjacent evaporator/condenser zones within said heat pipe by providing more than one baffle extending radially from an outside surface of said heat tube;
forming and separating adjacent evaporator and condenser regions within each said evaporator/condenser zone by providing a respective baffle of said more than one baffles extending radially from said outside surface of said heat tube to a four sided housing;
separating said first and second heat transfer fluids between adjacent said evaporator and condenser regions exterior to said heat pipe defined by said more than one baffles and said four sided housing;
delivering said first heat transfer fluid by an external heating source to said evaporator regions and out of communication with said condenser regions by the use of said more than one baffles;
delivering said second heat transfer fluid by an external cooling source to said condenser regions and out of communication with said evaporator regions by the use of said more than one baffles;
said adjacent evaporator/condenser zones being in open communication with each other internally within said heat pipe; and
wherein each evaporator region accepts input heat from said first heat transfer fluid to cause evaporation of the working fluid in each adjacent condenser region within said evaporator/condenser zone to transfer heat to said second heat transfer fluid using said heat pipe to produce vapor and moving said vapor to either side of said heat pipe by local pressure differences to condense in one or two adjacent condenser zones, where said vapor is absorbed as a liquid and flows back to one or two adjacent evaporator zones of said heat pipe;
each said evaporator zone creating at least one fluid loop whereby evaporated working fluid splits up left and right, condensing in adjacent condenser zones and said working fluid flows back to the respective evaporator zone as a liquid within said evaporator zone; and
said heat pipe adjacent said condenser zones thereby operating internally with multiple said adjacent evaporator/condenser zones as induced by respective external air flows.

13. The method of heat exchange as in claim 12, further comprising the step of providing a plurality of said heat pipes laid parallel to each other.

14. The method of heat exchange as in claim 12, wherein said vapor produced moves to either side by local pressure differences to condense in the two adjacent said condenser zones where said vapor is absorbed by a wick in said pairs of adjacent said evaporator/condenser zones in said heat pipe as a liquid and flows in the wick back to adjacent evaporator zones at each side, wherein further each said evaporator zone creates two fluid loops whereby evaporated working fluid splits up left and right, condensing in respective adjacent said condenser zones and flows back to the evaporator zone as a liquid within the wick.

15. The method of heat exchange as in claim 12 further comprising the steps of:
placing a cooling coil underneath said heat pipe heat exchanger with said more than one baffles maintaining manifold passageways for respective zone separations to provide dehumidification,
providing a drain pan under said cooling coil;
passing incoming air through each respective input of said manifold passageway and through said heat pipe heat exchanger then down through said cooling coil, then reversing direction through said drain pan, up through said cooling coil, further up through said heat pipe heat exchanger, and then discharging through an exhaust port of said manifold passageway, wherein the air flow is a two-pass dehumidification cycle.

16. The method as in claim 12 wherein said heat pipe is a straight heat pipe.

17. The method in claim 12 wherein said heat pipe is an undulating serpentine heat pipe.

18. A heat pipe heat exchanger comprising:
a length of a first heat pipe;
a housing having opposing side panels and opposing end panels creating a chamber therein, and a plurality of spaced baffles spaced along said chamber between said end panels in a direction transverse to said length of said first heat pipe creating a plurality of separate alternating hot and cold regions exterior to and along said length of said first heat pipe extending in said direction between said opposing end panels;
a wick lining an interior wall of said first heat pipe;
working fluid contained within said wick;
said plurality of spaced baffles on an outside of said first heat pipe in which cold air is delivered to said cold regions by an external cooling source and hot air is delivered to said hot regions by an external heating source and heat is withdrawn from said first heat pipe in said cold regions by condensation of the working fluid, while heat is added to said first heat pipe in said hot regions by evaporation of the working fluid, causing circulation of said working fluid within said first heat pipe;

said circulation consisting of working fluid in said wick being vaporized in said hot regions absorbing heat from said circulating heated fluid thereby cooling said circulating heated fluid, said vaporized working fluid circulating into and through said adjacent cold regions, said working fluid being condensed and absorbed into said wick within said cold regions giving up heat to said circulating cooler circulating fluid thereby transferring heat from said hot regions to said cold regions, said vaporized working fluid spreading out to adjacent cold regions on both sides of each hot region;

each pair of hot and cold regions comprising an internal zone, each zone being in open fluid communication with each of adjacent said zones within said first heat pipe; and wherein said adjacent cold and hot regions being in closed fluid communication with each other externally outside said first heat pipe within said chamber by said plurality of spaced baffles.

19. The heat pipe heat exchanger of claim 18 in which said first heat pipe has a diameter in the range of about 1/8 inch to about 2 inches.

20. The heat pipe heat exchanger of claim 18 further comprising a second heat pipe, wherein said first heat pipe is added to said second heat pipe in an end to end relationship.

21. The heat pipe heat exchanger of claim 18 further comprising a plurality of fins extending exteriorly from said first heat pipe between adjacent said baffles, wherein said plurality of fins are different in size than said plurality of baffles.

22. The heat pipe heat exchanger of claim 18 wherein said housing includes a top opening and a bottom opening, and wherein at least one said baffle of said plurality of baffles extends from said top opening to said bottom opening of said housing.

* * * * *